United States Patent Office 3,345,076
Patented Oct. 3, 1967

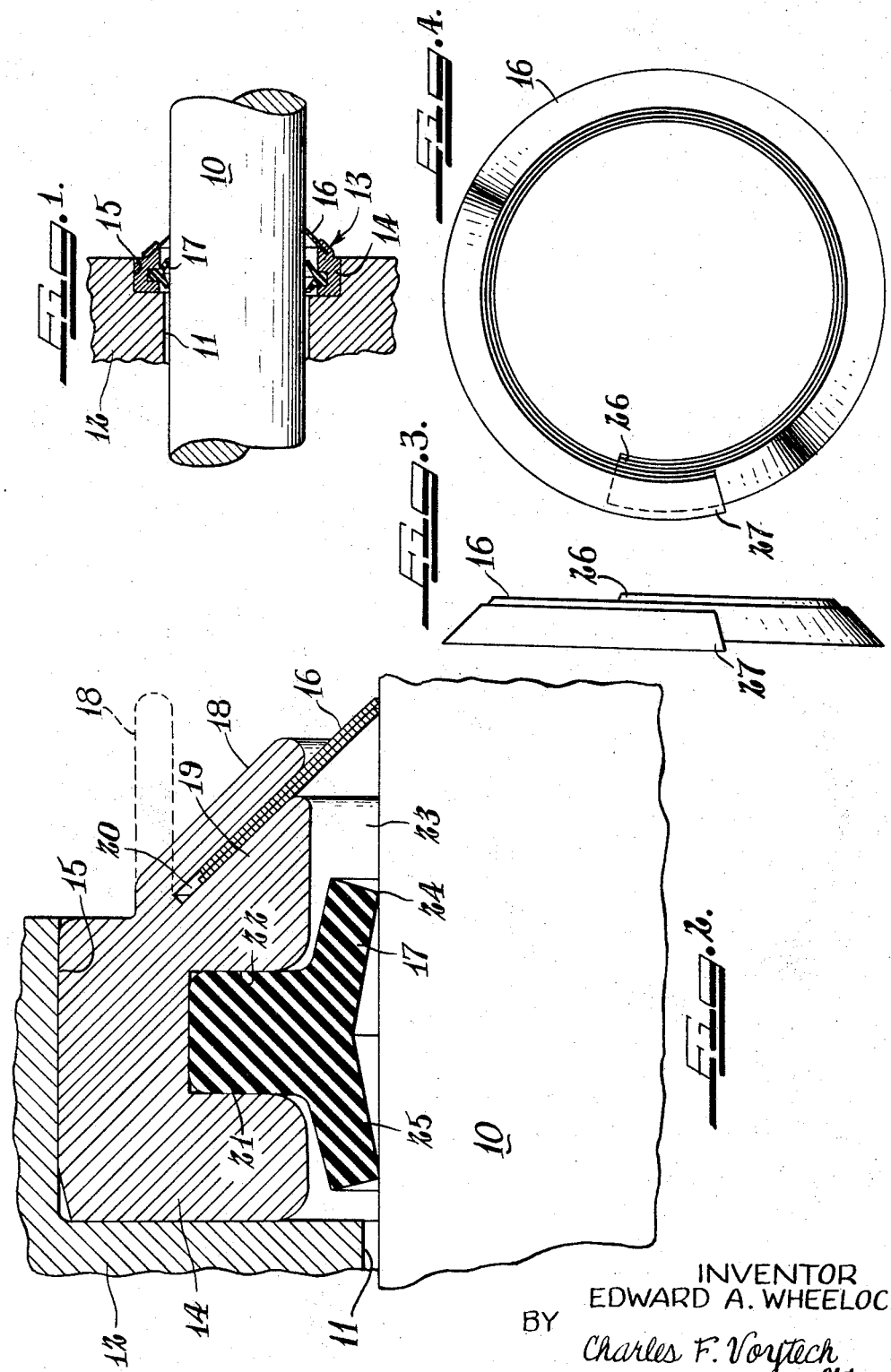

3,345,076
WIPER-SCRAPER SEAL
Edward A. Wheelock, Lake Zurich, Ill., assignor to Crane Packing Company, Morton Grove, Ill., a corporation of Illinois
Filed Apr. 21, 1965, Ser. No. 449,716
5 Claims. (Cl. 277—24)

ABSTRACT OF THE DISCLOSURE

A unitary wiper-scraper for reciprocating rods in which an annular metal holder is formed to have an internal radial groove into which is pressed an elastomeric wiper, and is formed further to have a conical groove facing a rod in which a sheet metal helical scraper is loosely held, the scraper being expansible and contractable to follow eccentric movement of the rod, and both the wiper and scraper being readily removable.

---

This invention relates to sealing means for reciprocating rods and shafts.

Reciprocating work devices such as fluid-operated cylinders for moving loads, and reciprocating pumps, both utilize a cylindrical chamber in which a fluid is confined by a piston. The latter is attached to a rod which extends through a sealed opening to the exterior of the chamber. The rod is reciprocated by the piston to do work, or in the case of a pump, the rod is reciprocated by an exterior power source to do work upon the fluid in the pump. In either case, portions of the rod alternately enter and leave the chamber.

Where the rod is exposed to an undesirable environment such as dirt, abrasive particles, tarry or other adhesive substances, it carries some of this environment back into the chamber on its inward stroke to contaminate the fluid in the chamber and increase the wear on the cylinder walls and on the rod itself as the latter passes through the sealed opening. On its outward stroke, the rod carries some of the lubricant which, in addition to possibly depleting the supply of lubricant in the cylinder, provides a carrier for dirt and abrasives during the inward stroke.

Devices have been proposed which provide means for wiping the rod as it moves into the chamber. Such devices have also been augmented by stiff scrapers which serve to remove the sticky and caked material from the rod. Such combined wiper-scraper devices, however, have not had very long life, and when worn, required the replacement of an entire wiper-scraper unit. Furthermore, prior wiper-scraper units have been concerned with preventing foreign material from being brought into a cylinder, not with preventing lubricant from being brought out of the cylinder.

An object of this invention is the provision of an improved wiper-scraper for a reciprocating rod or shaft which will have a longer period of usefulness.

Another object of this invention is to provide a wiper-scraper wherein the wiper element thereof is made of resilient deformable material such as rubber or similar elastomeric material and the scraper element thereof is made of sheet metal.

As a more specific object, this invention has within its purview the provision of a scraper for a reciprocating rod or shaft wherein the scraper is a metal cone loosely held in a retainer so that it can take its position from the rod or shaft and shift relative to its retainer to accommodate wobble.

A further specific object of this invention is the provision of a wiper of elastomeric material which is effective to wipe a reciprocating rod or shaft regardless of the direction of movement thereof.

A still further object of this invention is the provision of a metal scraper for a rod and a holder therefor wherein the scraper is removable and replaceable in the holder.

These and other objects of this invention will become apparent from the following detailed description of a preferred embodiment thereof when taken together with the accompanying drawings in which FIG. 1 is a sectional view through a fragment of a wall of a cylinder showing a reciprocating rod passing therethrough and the wiper-scraper of this invention installed in the wall around the rod;

FIG. 2 is a greatly enlarged quarter sectional view of the wiper-scraper of FIG. 1;

FIG. 3 is an enlarged side view of the metal scraper; and

FIG. 4 is a front elevational view of the metal scraper.

Referring now to the drawings for a detailed description of the preferred form of the invention shown therein for illustrative purposes, the environment for the wiper-scraper is a cylindrical rod 10 which extends from the interior of a work cylinder, or the like, through an opening 11 in an end wall 12 of said cylinder. The interior of the cylinder may be taken to be on the left of said wall 12, as viewed in FIG. 1, and the exterior is on the right of said wall. Rod 10 is reciprocated by any well known means such as a piston (not shown), or the like, disposed within said cylinder so that it passes through opening 11, first in an outward direction and then in an inward direction. During the outward movement, were it not for the wiper-scraper of this invention, lubricant from the interior of the cylinder would be brought out on the surface of rod 10 where dirt, sand and other undesirable foreign material might contact it and such foreign material would then be pulled into the cylinder on the return stroke of the rod.

The return of foreign and possibly abrasive material into the cylinder by rod 10 is prevented by wiper-scraper 13, which in the form selected to illustrate this invention, is a self-contained unit mounted in a retainer 14 which is press-fitted into an annular recess 15 formed in end wall 12. Said wiper-scraper is comprised of a hard scraper 16 which, as the name implies, scrapes the harder adhering material from the rod, and a wiper 17 which is soft and functions like a squeegee to remove liquids from the surface of the rod. Scrapers per se, and wipers per se, are known.

The novel features of the wiper-scraper of this invention are shown more clearly in FIGS. 2 and 3. Scrapers of the prior art have been formed from endless washers of thin material, usually metal, which were rigidly held in a retainer. The flexibility which inheres in a thin material was relied upon to absorb wobble of the rod relative to the cylinder end wall. Since the scraper was an endless ring, its internal diameter became gradually larger as the scraper wore, and its effectiveness to scrape the rod decreased until it became nil. Wobble of the rod increased the wear still more and in addition tended to localize the wear so that the inner edge of the scraper became out-of-round. When the scraper became incapable of performing its function, the entire retainer and scraper had to be removed and replaced.

The scraper of this invention differs from prior scrapers in that it is made from a strip of metal which has been wound upon itself to be resiliently expansible and contractible. Additionally, it is loosely held in its retainer so that it can move relative thereto to accommodate wobble of the rod. Thus, as shown in FIG. 3, the scraper 16 is comprised of a flat strip of rigid material such as Phosphor bronze which has been coiled upon itself for more than one turn and then formed in a conical die to have a frusto-conical shape. Other hard material, such as steel or the harder plastics, may also be used.

The retainer, as shown in FIG. 2, is preferably formed as a die casting, and is initially provided with an axially extending cylindrical flange 18 and a frusto-conical inner wall 19 surrounded by said flange. In the assembly of the scraper with the retainer, said scraper 16 is placed over wall 19 and flange 18 is bent inwardly until a frusto-conical recess 20 is formed between flange 18 and wall 19. It is contemplated that the greatest diameter of recess 20 will be larger than the greatest diameter of scraper 16 when the latter is contracted upon rod 10, so that said scraper will have room in the recess to move radially therein as the rod wobbles or moves radially relative to cylinder wall 12. It is also contemplated that the recess 20 will be wide enough to allow scraper 16 to move freely therein.

The scraper 16, being hard, removes the harder material from rod 10. The liquids, such as oil and water, are removed by wiper 17. Said wiper is disposed in retainer 14 at a location adjacent scraper 16 and axially offset therefrom. It is preferably a single-piece annulus of polymeric material so as to be resiliently deformable, and is formed by a molding operation. Said wiper is formed with a radially outwardly extending flange 21 which is snugly and frictionally received in an annular internal groove 22 in retainer 14.

The internal diameter of retainer 14 is considerably greater than the diameter of rod 10 to leave an annular space 23 therebetween. In said space 23 is disposed the wiper 17 which is a frusto-conical lip having a corner 24 in contact with rod 10. Said corner is normally of smaller diameter than rod 10, so that when the wiper is assembled over the rod 10, the lip is extended and bears resiliently against said rod to provide a wiping action.

Thus scraper 16 removes the harder material and wiper 17 removes the liquids, both, however, on the inward or leftward (FIG. 2) stroke of the rod. It is also important, however, that lubricant in the cylinder be wiped off the rod as the rod is leaving the cylinder, both to prevent loss of lubricant and to minimize any tendency of dirt to adhere to the rod. This is accomplished by forming an inner lip 25 on the wiper which may be identical to lip 17, but facing in the opposite axial direction so that it will wipe lubricant off rod 10 as the latter is leaving the cylinder. The lubricant wiped off by lip 25 falls back into the cylinder and is thus preserved.

Despite the improved construction of scraper 16, it may, nevertheless, wear and require replacement. With prior art devices, this entails the removal and replacement of the entire wiper-scraper 13, including housing 14 which may still be in acceptable condition. In the novel design herein disclosed, the scraper is loose in recess 20 and can be removed by grasping one end 26 (FIG. 3) with long nosed pliers and pulling the scraper as a strip out of said recess. A new scraper can be inserted into recess 20 by first inserting the outer end 27 (FIG. 3) thereof into the vacated recess and then coiling the remainder of the scraper thereinto.

The wiper can likewise be removed and replaced, since it is not bonded in recess 22 and has sufficient resilience to be pulled out of said recess.

It is apparent that the wiper-scraper of this invention possesses greater flexibility, particularly in the scraper, to increase the life thereof and that when the scraper is worn, it can readily be replaced, even without removing the retainer 14 from its recess in cylinder wall 12.

It is understood that the foregoing description is merely illustrative of a preferred embodiment of the invention and that the scope of the invention therefore is not to be limited thereto, but is to be determined by the appended claims.

I claim:

1. A sealing device for a rod passing through an opening in a housing, said device comprising a rigid single-piece annular holder for encircling said rod, said holder being press-fitted into said housing and having a conical nose section in which is formed a conical recess opening upon said rod, a sheet-metal helically wound strip loosely retained in said recess and having an internal diameter in its free state smaller than the outer diameter of said rod to bear resiliently upon and scrape said rod, and an elastomeric wiper removably retained in said holder adjacent said helically wound strip.

2. A sealing device as described in claim 1, said holder having an internal groove, and said elastomeric wiper having a radially outwardly extending flange received in said groove.

3. A sealing device as described in claim 2, said radial flange frictionally held in said radial groove such that the elastomeric wiper may be removed and replaced.

4. A sealing device as described in claim 1, said conical nose section including a conical lip spaced from the remainder of the nose section and defining therewith the said conical recess.

5. A sealing device as described in claim 1, said holder being initially molded with an axially extending flange encircling the conical nose section.

References Cited

UNITED STATES PATENTS

| | | | |
|---|---|---|---|
| 2,509,151 | 5/1950 | Kasten | 277—205 |
| 2,634,145 | 4/1953 | Monahan | 277—124 X |
| 2,833,577 | 5/1958 | Reynolds | 277—24 |
| 2,974,983 | 3/1961 | Meyer | 277—24 |

FOREIGN PATENTS

| | | |
|---|---|---|
| 122,476 | 10/1946 | Australia. |

SAMUEL ROTHBERG, *Primary Examiner,*